United States Patent [19]

Phillips

[11] Patent Number: 4,990,943
[45] Date of Patent: Feb. 5, 1991

[54] PLZT LASER MODULATOR

[75] Inventor: James R. Phillips, Albuquerque, N. Mex.

[73] Assignee: Motorola, Inc., Schaumburg, Ill.

[21] Appl. No.: 375,555

[22] Filed: Jul. 3, 1989

[51] Int. Cl.$^5$ .............................. G02F 1/03; G02F 1/07
[52] U.S. Cl. ..................................... 350/392; 350/385;
350/401; 372/36
[58] Field of Search ............... 350/356, 381, 385, 392,
350/401; 372/12, 127, 36; 356/365, 368; 358/61

[56] References Cited

U.S. PATENT DOCUMENTS

| | | | |
|---|---|---|---|
| 3,781,714 | 12/1973 | Schlossberg | 372/36 |
| 3,895,313 | 7/1975 | Seitz | 372/36 |
| 3,903,358 | 9/1975 | Roese | 358/61 |
| 4,406,521 | 9/1983 | Mir et al. | 350/392 |
| 4,607,917 | 8/1986 | Ebner et al. | 350/392 |
| 4,627,062 | 12/1986 | Bender | 372/36 |
| 4,630,040 | 12/1986 | Haertling | 350/390 |
| 4,636,786 | 1/1987 | Haertling | 350/392 |
| 4,744,640 | 5/1988 | Phillips | 350/392 |

FOREIGN PATENT DOCUMENTS 58-105120 6/1983 Japan .
528534 10/1976 U.S.S.R. ............................. 350/392

OTHER PUBLICATIONS

Cutchen et al., "PLZT Electrooptic Shutters: Applications"; Applied Optics, vol. 14, #8, 8/75.

Primary Examiner—Nelson Moskowitz
Attorney, Agent, or Firm—Joseph P. Krause

[57] ABSTRACT

A PLZT wafer modulates a laser light beam while dissipating heat into a heat sink. The rear side of the wafer is coated to act as a mirror to reflect incoming light and to transfer heat from the wafer. The front side of the wafer has electrodes, separated by a gap through which a laser light beam can pass. An incoming light beam is modulated by the PLZT when it is energized by an electric field on the two front side electrodes. The mirrored side reflects the beam so that it exits the front side.

14 Claims, 1 Drawing Sheet

PLZT LASER MODULATOR

BACKGROUND OF THE INVENTION

This invention relates to laser light modulation. In particular, this invention relates to devices that modulate light emitted from a laser.

Two technologies now in use to modulate laser light are acoustic optic modulators (AOM's) and mechanical deflection modulators (MDM's). MDM's are limited in frequency to the kilohertz range. AOM's, while usable at higher frequencies, are very expensiv (costing between $4,000 and $50,000 each).

Another method of modulating laser light employs the use of PLZT. PLZT is lanthanum modified lead zirconate titanate. PLZT is a polycrystalline ceramic which, when subjected to an electric field, rotates the polarization angle of a light wave and, when used with external polarizer, can be used as shutter for modulating laser light. By applying interdigitated electrodes onto a piece of PLZT, an electric field can be induced in the PLZT that modulates light passing through it. If polarized light passes through a PLZT wafer at an angle of 45 degrees with respect to an electric field applied to the PLZT, the plane of polarization is rotated (the amount of rotation as compared to the initial polarization plane being proportional to the strength of the applied field). With no field applied, light passes through the PLZT unaltered.

Rotation of the plane of polarization of light waves passing through PLZT is accomplished by having a light incident upon the PLZT wafer split into two rays that travel at different velocities through the wafer. As the two rays travel through the energized PLZT, one component, which is perpendicular to the electric field, is subjected to a higher index of refraction within the PLZT. When the two rays recombine upon exiting the PLZT, their recombination effectuates a phase shift of the light.

The amount of rotation of the plane of polarization through a PLZT wafer is dependent upon the strength of the electric field impressed upon it. A voltage required to generate a 90 degree rotation in a PLZT wafer is termed the "half wave voltage". Voltages above or below this value will cause more or less rotation.

A problem with prior art PLZT light modulators using interdigitated electrodes is the diffraction of a collimated light beam, including a laser beam, incident upon the surface of the PLZT by the edges of the electrodes. Another problem has been power dissipation by these device when operated at high frequencies. The power dissipation required of a PLZT light modulator is a function of its frequency. A PLZT light modulator operating at 1 MHz may be required to dissipate up to 250 watts of power as heat. Prior art PLZT laser light modulators are capable of dissipating heat through convection only. This convection cooling severely limits the operating frequency and increases the likelihood of a failure of a device. A PLZT laser light modulator which is improved heat dissipation would be an improvement over the prior art.

SUMMARY OF THE INVENTION

There is provided herein a PLZT laser modulator having improved heat dissipation which uses a PLZT wafer that has deposited onto one side of the wafer an electrode that may be mounted to a heat sink. The electrode substantially covers the entire face of one side of the PLZT wafer and functions as both a mirror and as a conduit of heat from the PLZT wafer to the heat sink. Second and third electrodes, deposited on the opposite side of the PLZT wafer, are formed with a slot between them through which light may pass such that a laser beam passing through the slot into the PLZT wafer impinges upon the first electrode acting as a mirror. Upon reflection by the first electrode, the laser light is directed back out through the PLZT wafer again, exiting the wafer through the slot between the second and third electrodes. The heat sink may be bonded to the first electrode using solder or any suitable adhesive that improves thermal conductivity of the electrode.

In the preferred embodiment, the first electrode was a layer of chrome deposited onto the planer side of the PLZT wafer followed by a layer of gold to improve electrical and thermal conductivity. A passivation layer, which prevents degradation of the ceramic element by the electric field to which the element is to be subjected to rotate the polarization plane, is deposited onto the second side of the PLZT covering the second and third electrodes. A glass layer helps the passivation layer adhere to the ceramic. The passivation layer, which in the preferred embodiments was a silicon gel, also aids in improving the matching of the index of refraction of the PLZT wafer to the outer glass layer.

DETAILED DESCRIPTION OF THE PREFERRED EMBODIMENT

Figure 1:
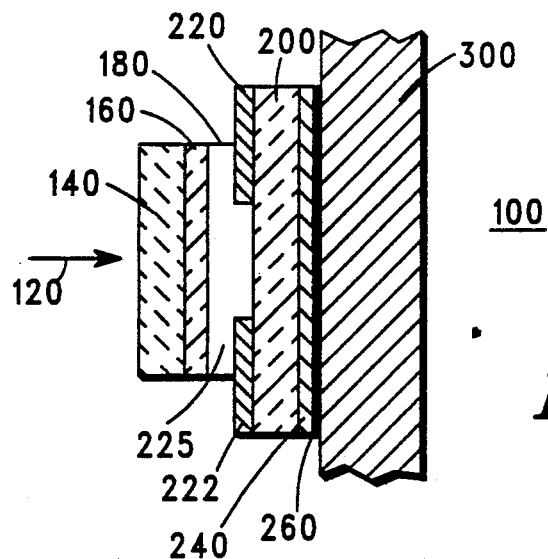
FIG. 1 shows a side view of a reflective PLZT laser light modulator having improved heat dissipation.

There is shown in FIG. 1 a side view of a reflective PLZT laser light modulator (100). A laser light beam (120) passes through a first glass layer (140) to a first polarizer (160). After passing through the first polarizer (160), the beam of light, now polarized, passes through a first passivation layer (180) that matches the index of refraction of the PLZT and protects the PLZT from reduction and space charge buildup caused by electric fields in the ceramic.

Upon passing through the passivation layer, the beam of light (120) enters the PLZT wafer (200). Having passed through the PLZT wafer the polarized beam light (120) impinges upon the back surface of the PLZT wafer where it is reflected by the mirror formed by the interface between the PLZT wafer (200) and the electrode (240) on the rear of the PLZT wafer (200). As the surfaces of the PLZT wafer are substantially planar and polished, application of a highly reflective metal to one surface effectively produce a mirror which will reflect light incident upon it. If the angle chosen for the entry of the light beam (120) is properly chosen, it will reflect at an angle off the mirrored surface existing between the PLZT wafer (200) and the electrode (240) and be reflected back out of the PLZT wafer through the slot (225) formed by the second and third electrodes deposited on the front of the PLZT wafer (220 and 222).

The electrode on the rear of the PLZT wafer (240), being deposited across the entire surface of the wafer and being metallic, greatly improves the heat dissipation from the PLZT wafer when the device is mounted to a substrate (300) as shown. Heat conduction from the PLZT wafer (200) through the electrode (240) to the heat sink (300) is enhanced by use of an appropriate solder or adhesive (260).

Figure 3:
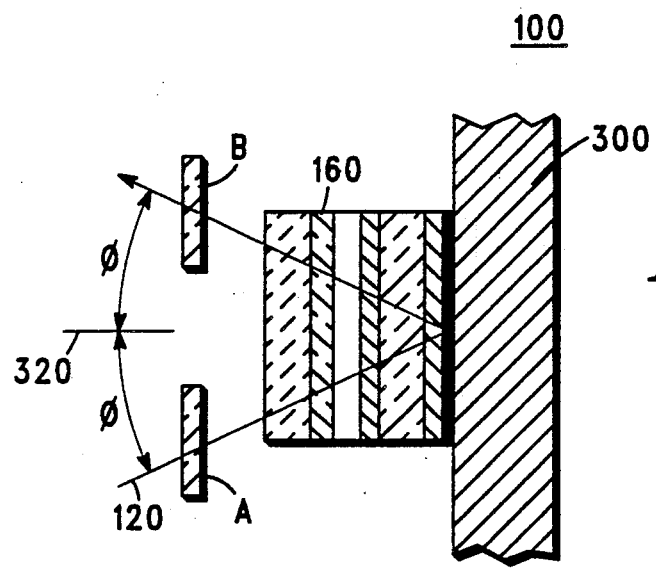
FIG. 3 shows a top view of the PLZT laser light modulator of FIG. 2.

FIG. 3 shows a top view of the PLZT laser light modulator shown in FIG. 1. In this drawing the angle of incidence, $\phi$, between the normal to the electrode surface (320) and the light beam (120) is selected to permit the light beam (120) to exit through the slot (225) after reflection by the first electrode (240).

Figure 2:
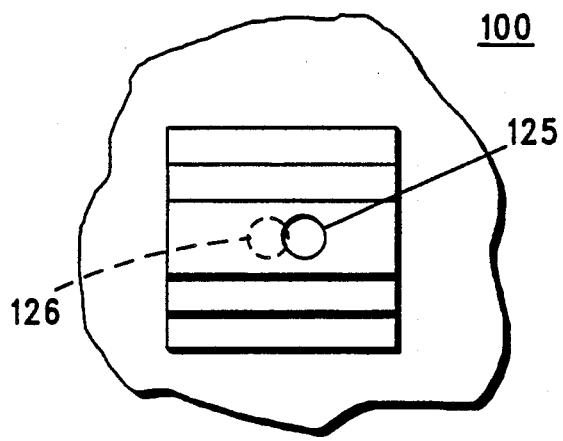
FIG. 2 shows a front elevation view of the reflective PLZT laser light modulator of FIG. 1.

FIG. 2 shows two circular markings (125 and 126) on the face of the glass screen (140) showing where the light beam would enter (125) and where it would exit (126) after reflection from the first electrode (240). The slight offset between these two circles is caused by the angle $\phi$ between the normal (320) and the light ray (120).

Referring back to FIG. 3 there is shown optional secondary polarizers, A and B. If the laser light beam (120) is originally polarized, polarizer B might be used instead of the first polarizer (160) to either block or transmit the polarized laser (121) depending upon its orientation to the incoming beam (120). If the laser light beam (120) is not polarized, polarizer A can be used to polarize the beam (120). Polarizers A and B would be used instead of the first polarizer (160) if a crossed or blocked-beam state is required with the PLZT (200) unenergized. If the polarizers A and B are oriented the same, they function the same as the first polarizer (160).

In the preferred embodiment, the first electrode was a layer of chrome sputtered onto the PLZT. A layer of gold was deposited onto the chrome to improve thermal and electrical conductivity.

The electric field in the PLZT is established by electric potential being carried by the second and third electrodes, (220 and 222). An alternate embodiment would include application of an electric potential to the first electrode (240, and normally not carrying a charge) to enhance the field in the wafer (200).

The spacing between the second and third electrodes (220 and 222) in the preferred embodiment was a distance equal to 1.5 times the diameter of the laser light beam (120). This spacing insures that the electrodes (220 and 222) will not cause fringing of the light beam (120) and that the beam passes through the PLZT where the electric field is uniform. Alternate embodiments could expand or contract the spacing between these electrodes.

Using the combination of elements shown in FIGS. 1, 2 and 3, a PLZT based laser light modulator has substantially improved heat dissipation capability that can be used at substantially higher operating frequencies without damaging the PLZT wafer.

What is claimed is:

1. A PLZT laser light modulator with improved heat dissipation capability comprised of:
   a PLZT element having at least first and second substantially planar side;
   first electrode means substantially covering said first planar side for reflecting light and conducting heat from said PLZT element, said first electrode means being deposited on said first substantially planar side;
   heat sink means coupled to said first electrode means for dissipating heat energy in said PLZT element that is coupled to said heat sink means through said first electrode means; and
   second and third electrode means for carrying an electric charge to establish an electric field in said PLZT element, said second and third electrode means being deposited on said second substantially planar side and having an included opening between said second and third electrodes to permit laser light to pass through said PLZT element, reflect off said first electrode means, and exit said PLZT element through said included opening between said second and third electrode.

2. The PLZT laser modulator of claim 1 including a thermally conductive adhesive layer between said heat sink means and said first electrode means for improving thermal conductivity between said heat sink means and said first electrode means.

3. The PLZT laser modulator of claim 1 where said first electrode means is a layer of chrome deposited onto said PLZT.

4. The PLZT laser modulator of claim 3 where said first electrode includes a layer of gold deposited over said chrome.

5. The PLZT laser modulator of claim 1 where said first electrode means forms a mirror surface on said first side of said PLZT element, capable of reflecting light.

6. The PLZT laser modulator of claim 1 including a passivation layer deposited over at least part of said second electrode means.

7. The PLZT laser modulator of claim 6 where said passivation layer includes silicon gel.

8. The PLZT laser modulator of claim 7 including a glass layer deposited on said silicon gel.

9. The PLZT laser modulator of claim 1 including first polarizer means for polarizing light, said first polarizer means being coupled to said laser modulator to polarize light incident upon said second side of said PLZT and to polarize light reflected from said first electrode means and exiting said second side of said PLZT.

10. The PLZT laser modulator of claim 9 including second polarizer means for polarizing light, said second polarizer means being located with respect to said PLZT laser modulator to polarize light reflected from said PLZT laser modulator.

11. The PLZT laser modulator of claim 10 including a third polarizer means for polarizing light, said third polarizer being located to said PLZT laser modulator to polarize light directed to said PLZT laser modulator.

12. The PLZT laser modulator of claim 1 wherein said opening between said second and third electrode means is a slot.

13. The PLZT laser modulator of claim 12 where said slot is at least one and a half times the width of the width of a laser beam incident upon said PLZT element.

14. The PLZT laser modulator of claim 1 where said first electrode means for reflecting light carries an electric charge.

* * * * *